(12) United States Patent
Senno et al.

(10) Patent No.: US 10,762,677 B2
(45) Date of Patent: Sep. 1, 2020

(54) DISPLAY APPARATUS, DISPLAY CONTROL APPARATUS, AND VEHICLE

(71) Applicant: HONDA MOTOR CO., LTD., Tokyo (JP)

(72) Inventors: Masaharu Senno, Wako (JP); Kohei Noguchi, Wako (JP); Yojiro Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/122,905

(22) Filed: Sep. 6, 2018

(65) Prior Publication Data

US 2019/0096107 A1 Mar. 28, 2019

(30) Foreign Application Priority Data

Sep. 27, 2017 (JP) .................................. 2017-186785

(51) Int. Cl.
| | |
|---|---|
| *G06T 11/60* | (2006.01) |
| *B60K 35/00* | (2006.01) |
| *B62J 99/00* | (2020.01) |
| *B60K 37/06* | (2006.01) |
| *B62J 50/20* | (2020.01) |

(52) U.S. Cl.
CPC .............. *G06T 11/60* (2013.01); *B60K 35/00* (2013.01); *B60K 37/06* (2013.01); *B62J 99/00* (2013.01); *B60K 2370/52* (2019.05); *B60W 2540/22* (2013.01); *B62J 50/20* (2020.02)

(58) Field of Classification Search
CPC ... B60K 35/00; B60K 2350/352; G06T 11/60; B62J 2099/0026; B62J 99/00
See application file for complete search history.

(56) References Cited

U.S. PATENT DOCUMENTS

| | | | | |
|---|---|---|---|---|
| 5,764,139 | A | * | 6/1998 | Nojima .................. B60K 35/00 340/438 |
| 8,456,382 | B2 | * | 6/2013 | Yamazaki ............ G01C 21/365 345/7 |
| 9,019,093 | B2 | | 4/2015 | Wendt et al. |
| 10,137,779 | B2 | | 11/2018 | Taguchi et al. |

(Continued)

FOREIGN PATENT DOCUMENTS

| | | |
|---|---|---|
| DE | 10322458 A1 | 12/2004 |
| DE | 102011111213 A1 | 2/2013 |

(Continued)

OTHER PUBLICATIONS

JP-2008026075-A (Machine Translation on Oct. 1, 2019) (Year: 2008).*

(Continued)

*Primary Examiner* — Michael Le
(74) *Attorney, Agent, or Firm* — Thomas | Horstemeyer, LLP

(57) ABSTRACT

The present invention provides a display apparatus that provides, to a driver of a vehicle, an image showing vehicle information related to the vehicle by superimposing the image on a foreground of the vehicle, the apparatus including an obtainment unit configured to obtain information related to a driving state of the driver, and a control unit configured to control a display mode of the image based on the information obtained by the obtainment unit.

14 Claims, 5 Drawing Sheets

(56) References Cited

U.S. PATENT DOCUMENTS

| | | | |
|---|---|---|---|
| 2007/0182529 A1* | 8/2007 | Dobler | B60K 28/066 340/438 |
| 2017/0053575 A1 | 2/2017 | Ishikawa et al. | |
| 2019/0011712 A1* | 1/2019 | Nagano | G02B 27/0101 |

FOREIGN PATENT DOCUMENTS

| | | | | |
|---|---|---|---|---|
| EP | 0771686 A2 | 5/1997 | | |
| EP | 1515295 A2 | 3/2005 | | |
| JP | H09-304103 A | 11/1997 | | |
| JP | 2008-014783 A | 1/2008 | | |
| JP | 2008-026075 A | 2/2008 | | |
| JP | 2008026075 A * | 2/2008 | | |
| JP | 2016-007980 A | 1/2016 | | |
| JP | 2016007980 A * | 1/2016 | | B60K 35/00 |
| WO | 2015/125363 A1 | 8/2015 | | |
| WO | 2017086380 A1 | 5/2017 | | |
| WO | WO-2017086380 A1 * | 5/2017 | | G06F 3/0484 |

OTHER PUBLICATIONS

WO-2017086380-A1 (Machine Translation on Sep. 18, 2019) (Year: 2017) (Year: 2017).*
JP-2016007980-A (Machine Translation on Oct. 1, 2019) (Year: 2016) (Year: 2016).*
European Search Report issued for European Patent Application No. 18193344.1 dated Feb. 26, 2019.
Japanese Office Action (w/ partial translation) issued for Japanese Patent Application No. 2017-186785 dated Jun. 3, 2019.

* cited by examiner

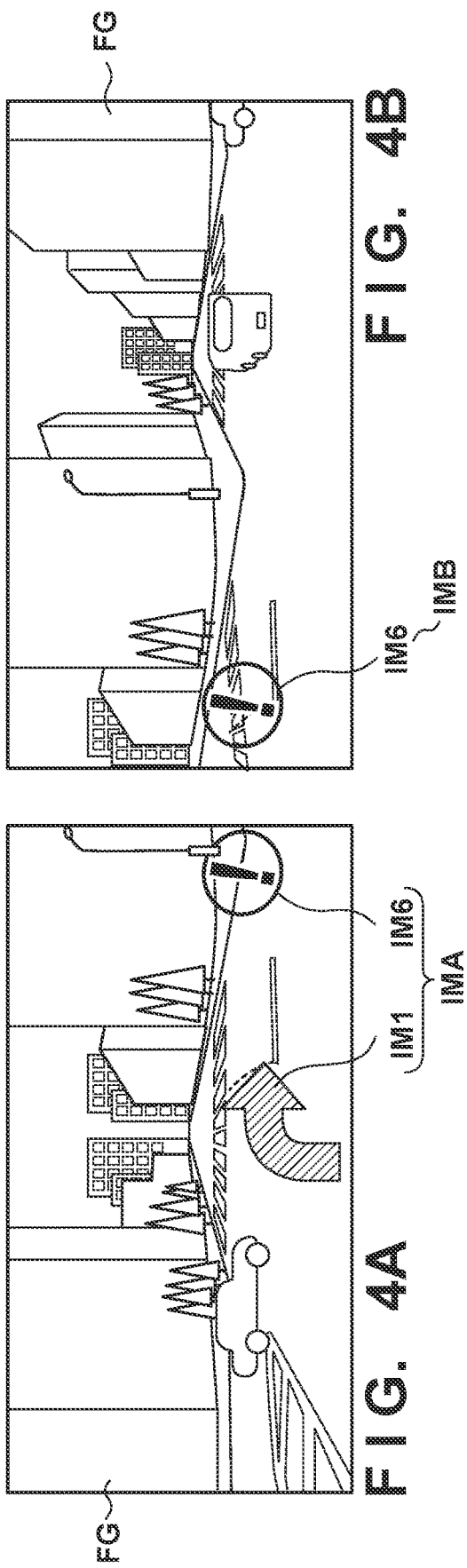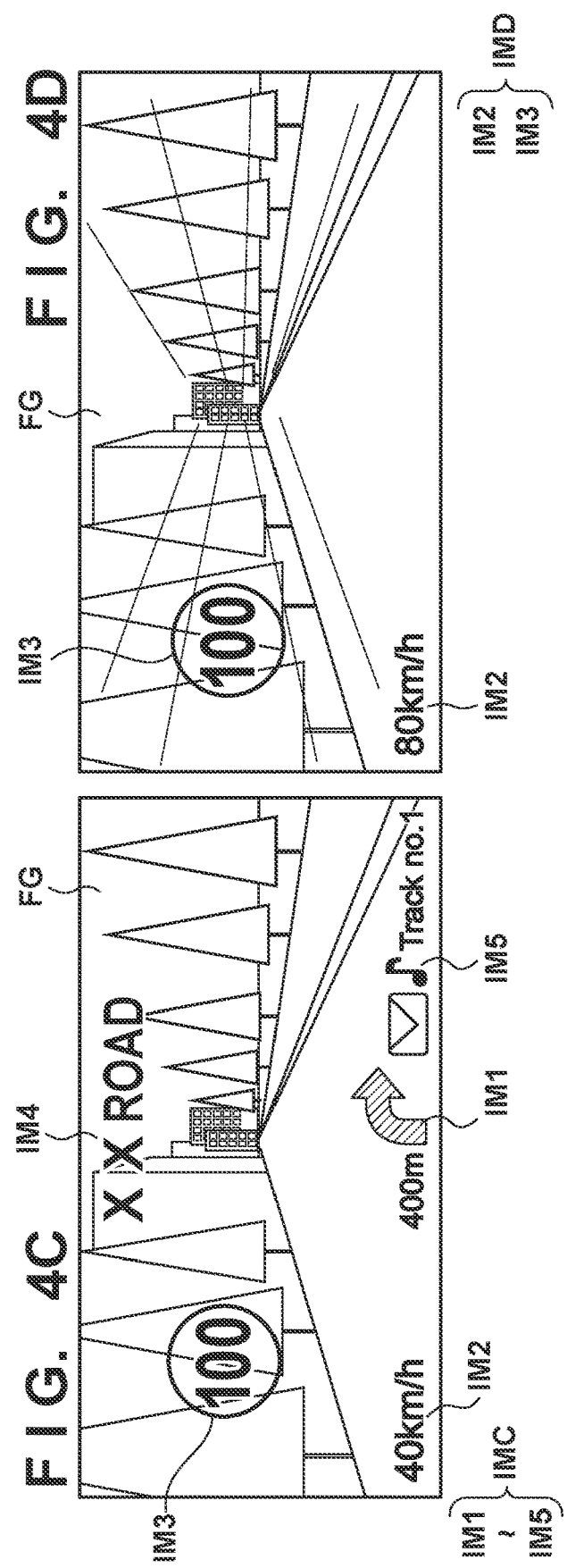

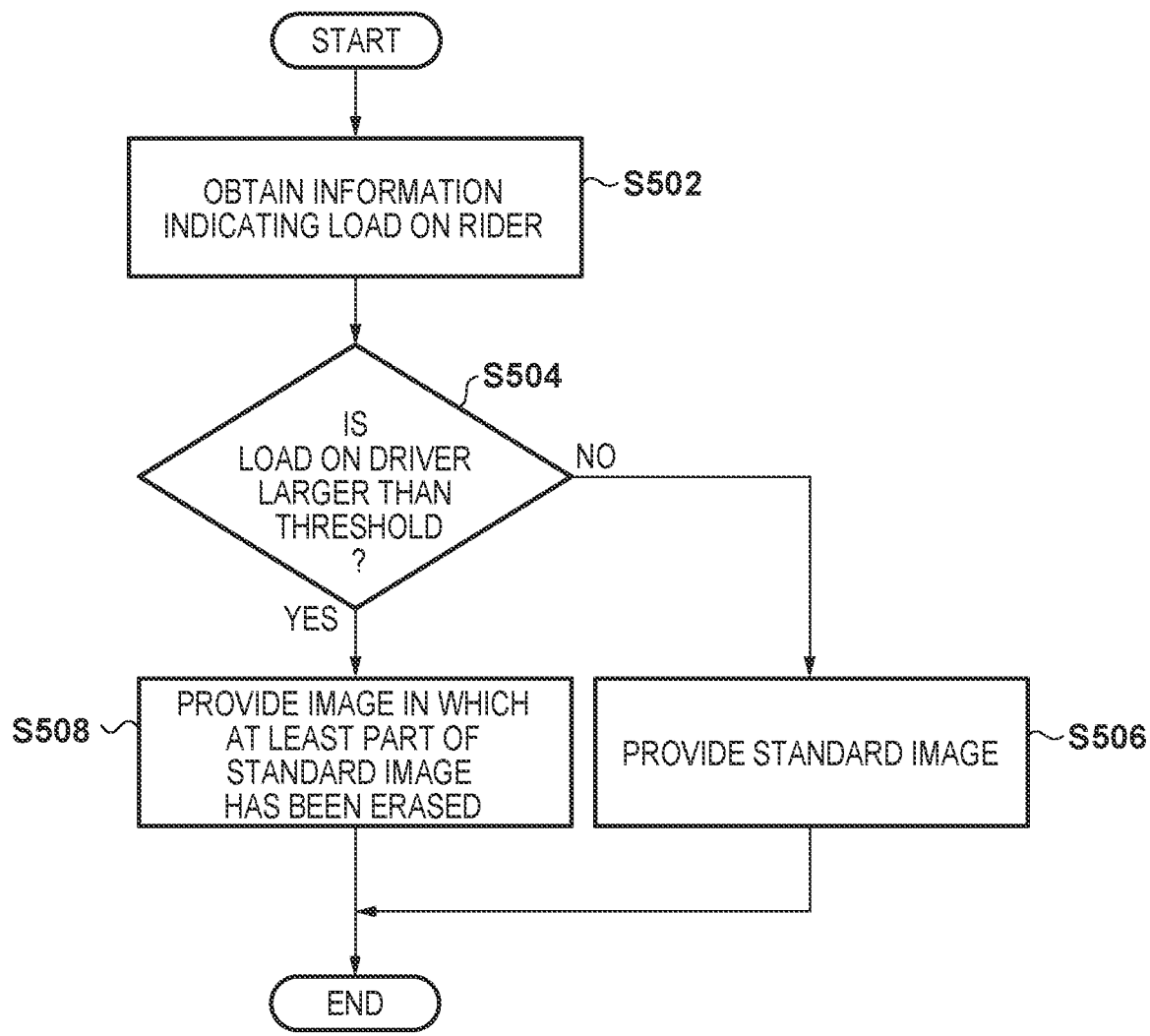

DISPLAY APPARATUS, DISPLAY CONTROL APPARATUS, AND VEHICLE

BACKGROUND OF THE INVENTION

Field of the Invention

The present invention relates to a display apparatus, a display control apparatus, and a vehicle.

Description of the Related Art

In recent years, in a four-wheeled vehicle, there is available a head-up display that provides, to a driver, basic information related to the vehicle by projecting (displaying) an image (an image which forms at an infinite point) indicating the information related to the vehicle onto the windshield and superimposing the image on the normal field of view (the foreground of the vehicle) of the driver. There is also a demand for this technique to be implemented in a two-wheeled vehicle, and for example, the application of a head wearable display apparatus called a head-mounted display to a two-wheeled vehicle is being considered. International Publication No. 2015/125363 discloses a technique of determining (controlling) the luminance of light emitted from a display apparatus, based on the illuminance (illuminance information) of light that enters the display apparatus from the outside, in order to improve the visibility of an image in accordance with various kinds of peripheral situations.

In vehicles such as two-wheeled vehicles and four-wheeled vehicles, depending on the state of the load acting on the driver, there are situations in which the normal field of view of the driver must be prioritized over (an image showing) the information related to the vehicle. However, since the technique disclosed in International Publication No. 2015/125363 does not consider a display mode change operation which takes into account the load on the driver of the vehicle, direct application of this technique is difficult.

SUMMARY OF THE INVENTION

The present invention provides, in a display apparatus that provides an image by superimposing the image on the foreground of a vehicle, a technique advantageous in both providing vehicle information related to the vehicle and ensuring the field of view of a driver.

According to the present invention, there is provided a display apparatus that provides, to a driver of a vehicle, an image showing vehicle information related to the vehicle by superimposing the image on a foreground of the vehicle, the apparatus including an obtainment unit configured to obtain information related to a driving state of the driver, and a control unit configured to control a display mode of the image based on the information obtained by the obtainment unit.

Further objects or other aspects of the present invention will become apparent by the preferred embodiment to be described below with reference to the accompanying drawings.

BRIEF DESCRIPTION OF THE DRAWINGS

FIGS. 4A to 4D are views showing specific examples of display mode control of the image which shows the vehicle information related to the motorcycle.

FIG. 5 is a flowchart for explaining processing for controlling the display mode of the image which shows the vehicle information related to the motorcycle.

DESCRIPTION OF THE EMBODIMENT

Figure 1:
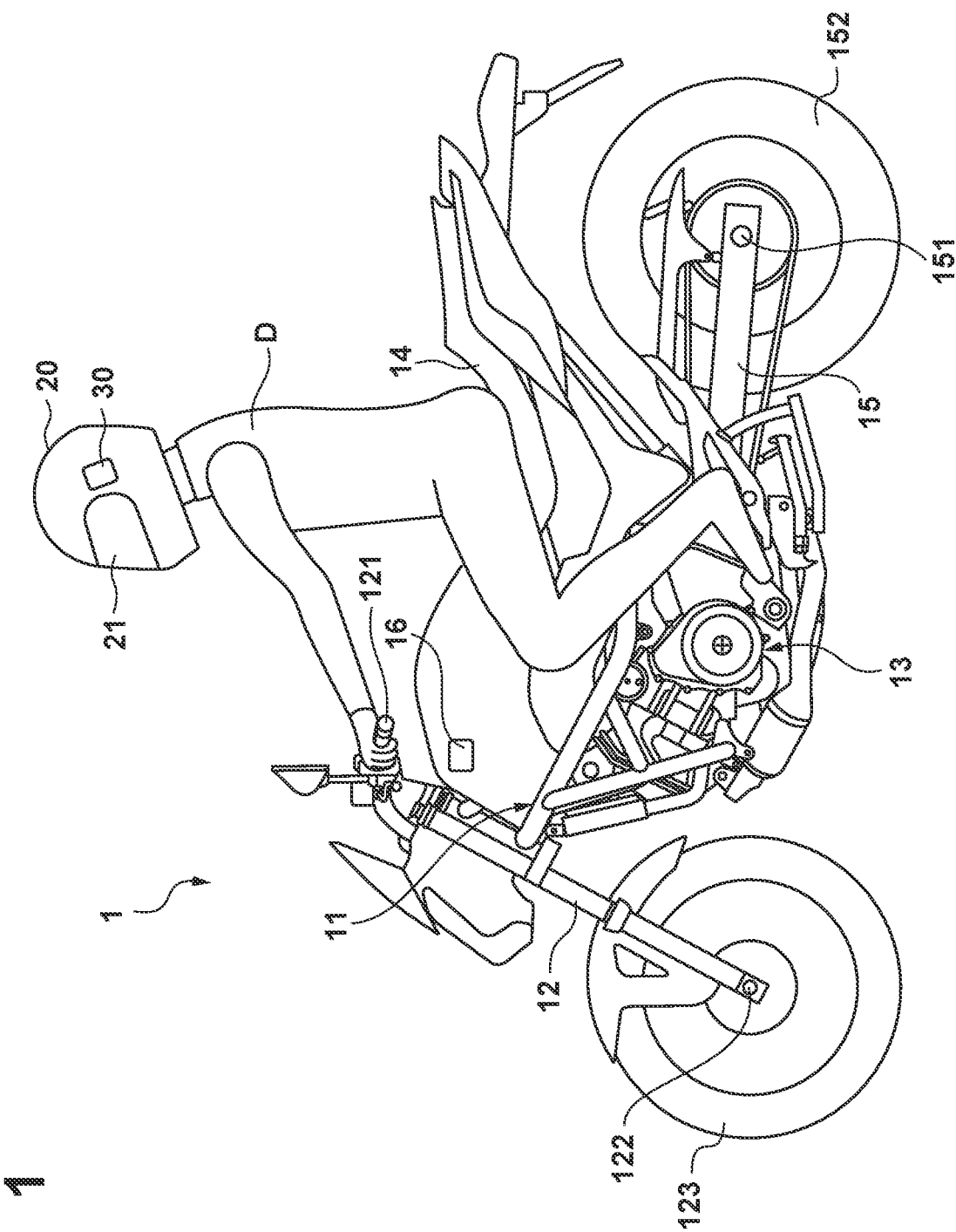
FIG. 1 is a schematic side view showing a motorcycle and a rider according to an embodiment of the present invention.

A preferred embodiment of the present invention will be described below with reference to the accompanying drawings. Note that the same reference numerals denote the same components throughout the drawings and a repetitive description thereof will be omitted.

FIG. 1 is a schematic side view showing a rider D and a motorcycle 1 according to an embodiment of the present invention. The motorcycle 1 is a straddle type vehicle ridden by the rider D. The motorcycle 1 includes a vehicle body frame 11 which serves as the framework of the vehicle, a front fork 12 which is supported by the vehicle body frame 11, an engine 13, a seat 14, a swing arm 15, and a detector 16.

The vehicle body frame 11 includes, for example, a head pipe that steerably supports the front fork 12, a main frame extending downward in a rear-diagonal direction from the lower portion of the head pipe, a center frame extending downward from the rear end of the main frame to the rear side, a seat rail extending upward from the rear end of the main frame to the rear side, a down frame extending from the front end of the main frame in a lower rear-diagonal direction, and an upper frame extending downward, to the rear side, from the upper portion of the head pipe to the main frame.

A handlebar 121 is supported on the upper end of the front fork 12, and a front wheel 123 is supported via an axle shaft 122 on the lower end of the front fork 12. The engine 13 includes, for example, a crank case and a cylinder portion arranged so as to tilt forwardly from the crank case. Note that a transmission may be integrally arranged in the rear portion of the crank case. The seat 14 is arranged on the upper portion of the seat rail. The swing arm 15 is supported by the center frame so as to be vertically swingable, and the rear end of the swing arm 15 supports a rear wheel 151 via an axle shaft 152.

The detector 16 has a function of detecting information related to the driving state of the rider D. In this embodiment, the detector 16 detects, as the information related to the driving state, information indicating the load on the rider D. Here, the information indicating the load on the rider D includes, for example, information indicating the traveling speed of the motorcycle (vehicle) 1, information indicating the acceleration of the traveling motorcycle 1, information indicating the bank angle of the traveling motorcycle 1, information indicating the handle operation (that is, steering of the handlebar 121) by the rider D, information indicating the brake operation by the rider D, and the like. These pieces of information can be detected by the various kinds of sensors (for example, a speed sensor, an acceleration sensor, a gyro sensor, a sensor to detect the driving operation (steering), and the like) provided in the motorcycle 1. The information indicating the load on the rider D also includes information indicating the speed of the head of the rider D during traveling and information indicating the acceleration of the head of the rider D during traveling. These pieces of information can be detected by, for example, arranging a position sensor or the like that detects the position of the head (a helmet 20) of the rider D on the motorcycle 1. In addition, information indicating the load on the rider D includes information that indicates the traveling position of the motorcycle 1 which includes at least one piece of information indicating the radius of curvature of the road on which the motorcycle 1 is traveling, information indicating that the traveling position of the motorcycle 1 is at an intersection, and information indicating that the traveling position of the motorcycle 1 is in an area with high incidence of accidents. These pieces of information can be detected by a GPS arranged in the motorcycle 1. Hence, although the detector 16 is illustrated as if it is arranged in one part of the motorcycle 1 in FIG. 1, various kinds of sensors are arranged in respective parts of the motorcycle 1 in reality, and at least one of the pieces of information described above is detected.

The rider D wears the helmet 20, sits on the seat 14, and drives the motorcycle 1 via the handlebar 121. The helmet 20 has the function of protecting the head (preventing or reducing an external injury to the head) of the rider D at the time of an accident or fall while the rider D is riding the motorcycle 1. In this embodiment, a display apparatus 30 for providing, to the rider D of the motorcycle (vehicle) 1, vehicle information related to the motorcycle 1 has been arranged in the helmet 20. The display apparatus 30 provides an image showing the vehicle information related to the motorcycle 1 by projecting the image onto a shield 21 of the helmet 20 and superimposing the image on the foreground (that is the field of view of the rider D) of the motorcycle 1. In this manner, the display apparatus 30 is implemented as a display apparatus worn on the head of the rider D, that is, a so-called head-mounted display in this embodiment.

Figure 2:
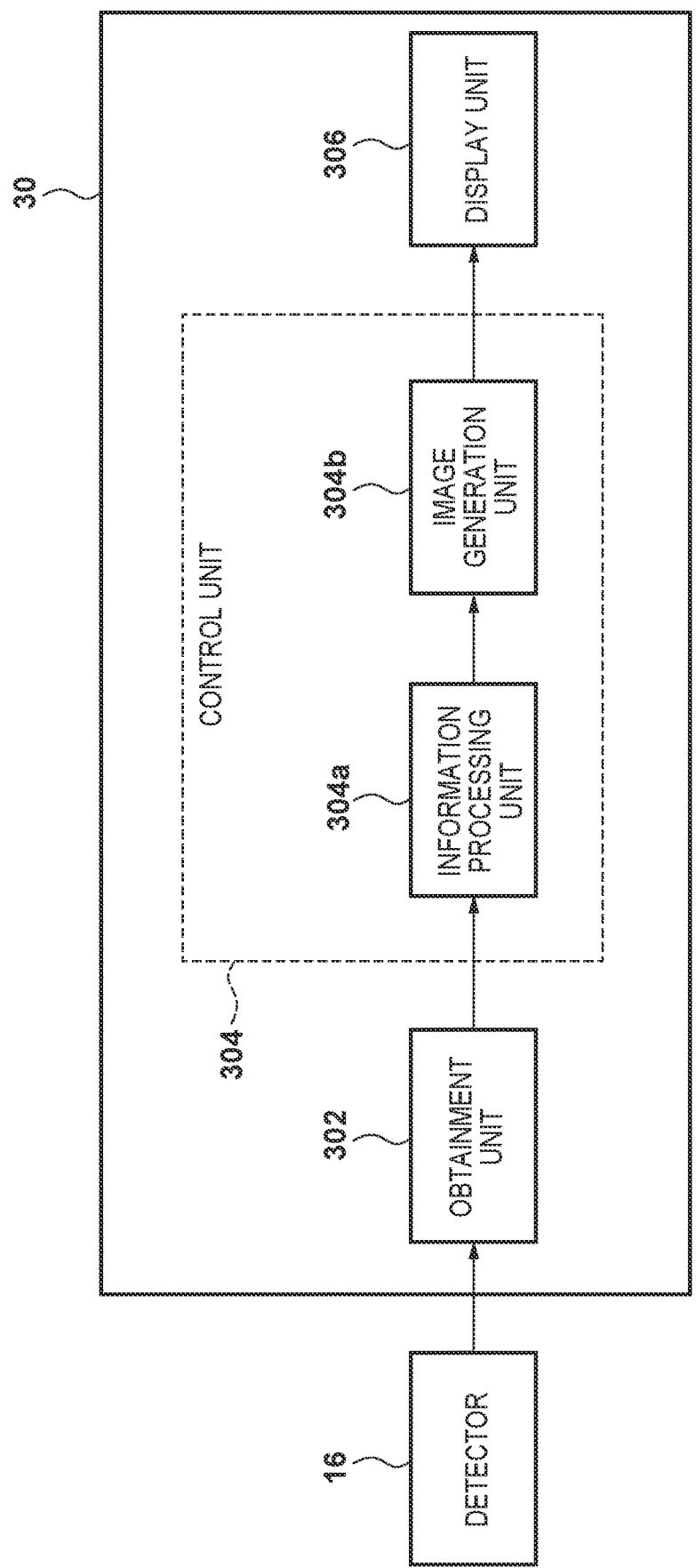
FIG. 2 is a schematic block diagram showing the arrangement of a display apparatus according to the embodiment of the present invention.

The arrangement of the display apparatus 30 will be described with reference to FIG. 2. FIG. 2 is a schematic block diagram showing the arrangement of the display apparatus 30. A display apparatus 30 includes an obtainment unit 302, a control unit 304, and a display unit 306.

The obtainment unit 302 has a function of communicating with the motorcycle 1. The obtainment unit 302 obtains the information related to the driving state of the rider D from the detector 16 of the motorcycle 1, that is, the information indicating the load on the rider D in this embodiment and transmits the obtained information to the control unit 304.

The control unit 304 includes a CPU, a memory, and the like and controls the overall (each unit of) display apparatus 30. In this embodiment, the control unit 304 controls the display mode of the image showing the vehicle information related to the motorcycle 1, which is to be superimposed and provided on the foreground of the motorcycle 1, based on the information indicating the load on the rider D obtained by the obtainment unit 302. The control unit 304 includes, for example, as shown in FIG. 2, an information processing unit 304a that creates the content of the vehicle information related to the motorcycle 1 in accordance with the pieces of information indicating the load on the rider D and an image generation unit 304b that generates image data which includes the content created by the information processing unit 304a.

The display unit 306 displays, to the rider D, the image showing the vehicle information related to the motorcycle 1 under the control of the control unit 304. In this embodiment, the display unit 306 displays the image by projecting, to the shield 21 of the helmet 20, an image corresponding to the image data generated by the image generation unit 304b and superimposing the image on the foreground of the motorcycle 1.

When the image showing the vehicle information related to the motorcycle 1 is to be superimposed on the foreground of the motorcycle 1 and displayed as in the manner of the display apparatus 30 according to this embodiment, the field of view of the rider D must be ensured in accordance with the state of the rider D so that the attention of the rider D will not be directed too much to the image. More specifically, there are cases in which the field of view of the rider D must be prioritized over (the image showing) the vehicle information related to the motorcycle 1 in accordance with the driving state (load state) of the rider D. Hence, as described above, the control unit 304 that controls the display mode of the image showing the vehicle information related to the motorcycle 1 is provided in this embodiment.

Figure 3:
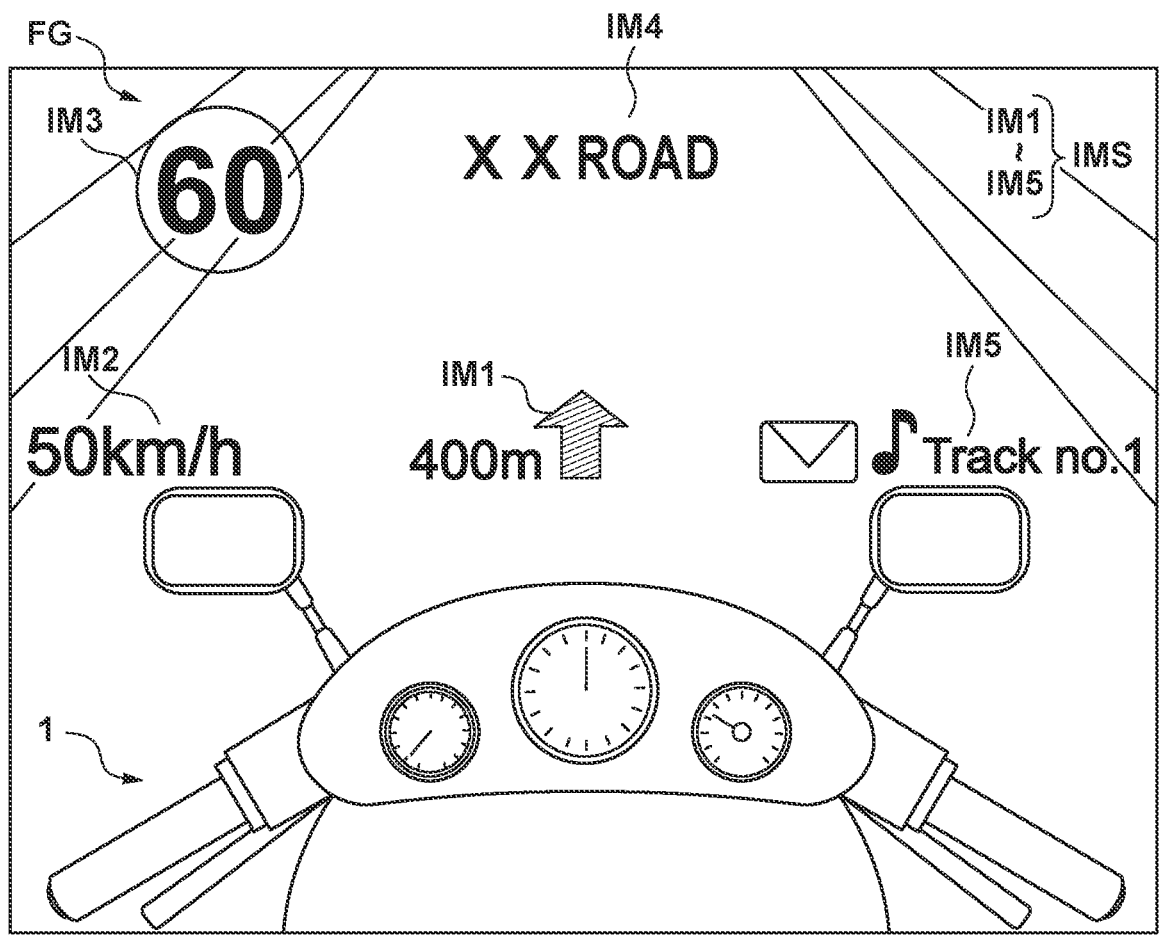
FIG. 3 is a view showing an example of a foreground (the field of view of the rider) of the motorcycle and an image which is superimposed and provided on the foreground of the motorcycle and shows vehicle information related to the motorcycle.

A control operation of the display mode of the image showing the vehicle information related to the motorcycle 1 in the control unit 304 will be described hereinafter. FIG. 3 is a view showing an example of a foreground FG (the field of view of the rider D) of the motorcycle 1 and an image IMS showing the vehicle information related to the motorcycle 1 which is superimposed and provided on the foreground of the motorcycle 1. The image IMS is the standard image to be superimposed and provided on the foreground FG on the motorcycle 1 when the driving state of the rider D is in the normal state, that is, when the load on the rider D is equal to or smaller than a threshold.

The image IMS includes a plurality of partial images each indicating a different piece of the plurality of pieces of vehicle information. In FIG. 3, the image IMS includes a first partial image IM1, a second partial image IM2, a third partial image IM3, a fourth partial image IM4, and a fifth partial image IM5. Each of the plurality of pieces of vehicle information has a priority indicating the degree of priority of the information to be provided to the rider D. For example, the plurality of pieces of vehicle information include, in descending order of priority, information related to the safety of the motorcycle 1, information related to the route of the motorcycle 1, information related to the traveling speed of the motorcycle 1, and information related to a traffic sign at the traveling position of the motorcycle 1. In this embodiment, the first partial image IM1 indicates "straight forward" as the information related to the route of the motorcycle 1, the second partial image IM2 indicates "50 km/h" as the information related to the traveling speed of the motorcycle 1, and the third partial image IM3 indicates "speed limit 60 km/h" as the information related to the traffic sign at the traveling position of the motorcycle 1. Additionally, as other pieces of information, the image IMS may include the fourth partial image IM4 indicating "xx Road" as information related to the road of the traveling position of the motorcycle 1, the fifth partial image IM5 indicating "Track no. 1" as information related to the music being played on the motorcycle 1.

In a case in which the load on the rider D obtained by the obtainment unit 302 is equal to or smaller than the threshold, the control unit 304 superimposes and provides the image IMS (standard image) shown in FIG. 3 on the foreground FG of the motorcycle 1. When the driving state of the rider D changes and the load on the rider D obtained by the obtainment unit 302 becomes larger than the threshold, the control unit 304 erases at a part of the image IMS, for example, some of the first partial image IM1 to fifth partial image IM5, superimposed and provided on the foreground FG of the motorcycle 1. This can prioritize (ensure) the field of view of the rider D than the vehicle information related to the motorcycle 1 in accordance with the state of the rider D. Hence, for example, when the rider D has a large load, it can prevent the rider D from directing too much attention to the vehicle information and allow the rider D to focus on driving.

Here, since the above-described threshold is related to the safety of driving the motorcycle 1, it is preferable for threshold to basically be set in advance. However, the threshold may be settable (changeable) by an operation by the rider D. In this case, however, the rider D needs to not set the threshold too small.

The control unit 304 erases at least a part of the image IMS which is superimposed and provided on the foreground FG of the motorcycle 1 so that a portion where the image shows the vehicle information of the motorcycle 1 is superimposed on the foreground FG of the motorcycle 1 will become smaller as the load on the rider D obtained by the obtainment unit 302 increases. For example, when the load on the rider D is a first load, the control unit 304 erases the fifth partial image IM5 from the image IMS, and when the load on the rider D is a second load larger than the first load, the control unit erases the fourth partial image IM4 and the third partial image IM3 in addition to the fifth partial image IM5 from the image IMS (that is, the control unit increase the number of partial images to be erased from the image IMS). As a result, the visual field of the rider D can be prioritized stepwise in accordance with the magnitude of the load on the rider D, and it possible to both provide the vehicle information related to the motorcycle 1 and ensure the visual field of the rider D.

Note that when at least a part of the image IMS superimposed and provided on the foreground FG of the motorcycle 1 is to be erased in accordance with the load on the rider D, the control unit 304 can start to sequentially erase a partial image from a partial image with low priority among the plurality of partial images included in the image IMS. For example, in this embodiment, partial images are erased, from the image IMS, in the order of the fifth partial image IM5, the fourth partial image IM4, the third partial image IM3, the second partial image IM2, and the first partial image IM1. In this manner, by erasing the partial images from those with low priority, pieces of information such as the information related to the safety of the motorcycle 1 and the like can be left on the image IMS even when the load on the rider D is equal to or larger than the threshold if the load is not too large.

If the load on the rider D obtained by the obtainment unit 302 is larger than threshold, the control unit 304 may make the size of the image, showing the vehicle information related to the motorcycle 1 which is superimposed and provided on the foreground FG of the motorcycle 1, be smaller than the size of the image IMS, which is superimposed and provided on the foreground FG of the motorcycle 1 when the load on the rider D is equal to or smaller than the threshold. As a result, it is possible to provide the vehicle information related to the motorcycle 1 in accordance with the state of the rider D while ensuring the field of view of the rider D.

Note that the control unit 304 can decrease the size of the image which shows the vehicle information related to the motorcycle 1 and is superimposed and provided on the foreground FG of the motorcycle 1 as the load on the rider D obtained by the obtainment unit 302 increases. This can prioritize the field of view of the rider D stepwise in accordance with the magnitude of the load on the rider D.

The control unit 304 may change the position of the image, which shows the vehicle information related to the motorcycle 1 and is superimposed and provided on the foreground FG of the motorcycle 1, based on the direction of the load acting on the rider D obtained by the obtainment unit 302. More specifically, the control unit 304 first determines whether the direction of the load acting on the rider D is rightward or leftward with respect to the direction of the field of view of the rider D. In this determination, for example, the handle steering operation of the rider D which is detected by the detector 16 and the like are used. If the direction of the load is rightward, the control unit changes the position of the image, which shows the vehicle information related to the motorcycle 1 and is superimposed and provided on the foreground FG of the motorcycle 1, toward the left. On the other hand, if the direction of the load is leftward, the position of the image, which shows the vehicle information related to the motorcycle 1 and is superimposed and provided on the foreground FG of the motorcycle 1, is changed rightward by the control unit. This can ensure the field of view of the rider D with respect to the direction of the load acting on the rider D.

In a case in which the information indicating the load on the rider D includes the information indicating the traveling speed of the motorcycle 1 and the traveling speed of the motorcycle 1 obtained by the obtainment unit 302 is higher than a predetermined speed, the amount of vehicle information displayed on the upper part of the image, which shows the vehicle information related to the motorcycle 1 and is superimposed and provided on the foreground FG of the motorcycle 1, will be made smaller than the amount of vehicle information displayed on the upper part of a standard image (for example, the image IMS shown in FIG. 3) which is to be superimposed and provided on the foreground FG of the motorcycle 1 when the traveling speed of the motorcycle 1 is a predetermined speed or less. This can ensure the upper part of the field of view of the rider D which is generally needed when the motorcycle 1 has a high traveling speed.

Here, a more specific example of the control of the display mode of the image which shows the vehicle information related to the motorcycle 1 by the control unit 304 will be described with reference to FIGS. 4A to 4D. FIG. 4A is a view showing an example of an image IMA which shows the vehicle information related to the motorcycle 1 and is superimposed and provided on the foreground FG of the motorcycle 1 in a case in which the motorcycle 1 is to enter an intersection and turn right. When the motorcycle 1 is to enter an intersection and turn right, the load on the rider D increases (becomes larger than the threshold) for the rider D to safely drive the motorcycle 1. Hence, as shown in FIG. 4A, the control unit 304 erases the fifth partial image IM5, the fourth partial image IM4, the third partial image IM3, and the second partial image IM2 from the image IMS shown in FIG. 3 and superimposes and provides, on the foreground FG of the motorcycle 1, the image IMA which includes the first partial image IM1 indicating "turn right" as information related to the route of the motorcycle 1. Note that the image IMA includes a sixth partial image IM6 indicating "ITS (Intelligent Transport System) display" as information related to the safety of the motorcycle 1. However, when the motorcycle 1 is to turn right, the position of the sixth partial image IM6 may be changed leftward since the direction of the load acting on the rider D is rightward with respect to the field of view of the rider D.

FIG. 4B is a view showing an example of an image IMB which shows the vehicle information related to the motorcycle 1 and is superimposed and provided on the foreground FG of the motorcycle 1 in a case in which the motorcycle 1 enters an intersection and makes a turn. When the motorcycle 1 is to enter the intersection and make a turn, the load acting on the rider D is larger than that a case in which the motorcycle 1 is to enter the intersection and turn right. Hence, as shown in FIG. 4B, the control unit 304 superimposes and provides, on the foreground FG of the motorcycle 1, the image IMB which is obtained by erasing the fifth partial image IM5, the fourth partial image IM4, the third partial image IM3, the second partial image IM2, and the first partial image IM1 from the image IMS shown in FIG. 3. Note that the sixth partial image IM6 is included on the left side in the image IMB since a case in which the motorcycle 1 makes a turn from the right side has been assumed (a case in which the direction of the load acting on the rider D is rightward with respect to the direction of the field of view of the rider D).

FIG. 4C is a view showing an example of an image IMC which shows the vehicle information related to the motorcycle 1 and is superimposed and provided on the foreground FG of the motorcycle 1 in a case in which the motorcycle 1 travels straight at low speed. When the motorcycle 1 travels straight at low speed, the load on the rider D is not large. Hence, as shown in FIG. 4C, the control unit 304 superimposes and provides the image IMC, which includes the first partial image IM1, the second partial image IM2, the third partial image IM3, fourth partial image IM4, and the fifth partial image IM5, on the foreground FG of the motorcycle 1 in the same manner as the image IMS shown in FIG. 3. Note that in FIG. 4C, the first partial image IM1 indicates "in 400 m, turn right" as information related to the route of motorcycle 1.

FIG. 4D is a view showing an example of an image IMD which shows the vehicle information related to the motorcycle 1 and is superimposed and provided on the foreground FG of the motorcycle 1 in a case in which the motorcycle 1 travels straight at a high speed. When the motorcycle 1 travels straight at a high speed (at a speed higher than the predetermined traveling speed), the load on the rider D is larger than that when the motorcycle 1 travels straight at a low speed. Hence, as shown in FIG. 4D, the control unit 304 superimposes and provides, on the foreground FG of the motorcycle 1, the image IMD which includes the second partial image IM2 and the third partial image IM3 but from which the fifth partial image IM5, the fourth partial image IM4, and the first partial image IM1 have been erased from the image IMS shown in FIG. 3. In addition, the amount of vehicle information on the upper part of the image IMD is made less than the amount of vehicle information on the upper part of the image IMC.

The display processing of the display apparatus 30, more specifically, the processing for controlling the display mode of the image which shows the vehicle information related to the motorcycle 1 will be described with reference to FIG. 5. In step S502, the obtainment unit 302 obtains, from the detector 16 of the motorcycle 1, information indicating the load on the rider D as information related to the driving state of the rider D. In step S504, the control unit 304 determines whether the load on the rider D obtained in step S502 is larger than the threshold. If the load on the rider D is equal to or smaller than the threshold, the control unit 304 superimposes and provides, in step S506, the image IMS (standard image) shown in FIG. 3 on the foreground FG of the motorcycle 1. On the other hand, if the load on the rider D is larger than the threshold, the control unit 304 erases, in step S508, at least a part of the image IMS (standard image) shown in FIG. 3 and superimposes and provides, for example, the image IMA shown in FIG. 4A or the image IMB shown in FIG. 4B on the foreground FG of the motorcycle 1.

In this manner, according to this embodiment, it is possible to both provide the vehicle information related to the motorcycle 1 and ensure the field of view of the rider D in accordance with the driving state of the rider D. Accordingly, since the field of view of the rider D can be prioritized (ensured) over the vehicle information related to the motorcycle 1 in accordance with the state of the motorcycle 1, the present invention is advantageous in reducing the load on the rider D during driving of the motorcycle 1.

Although a case in which the detector 16 for detecting the load on the rider D is arranged in the motorcycle 1 has been exemplified in this embodiment, a part or the whole detector 16 may be arranged in the display apparatus 30. A display control apparatus that has the function of the obtainment unit 302 and the function of the control unit 304 and controls a display apparatus that includes only the display unit 306 also forms an aspect of the present invention.

Furthermore, although a case in which the image which shows the vehicle information related to the motorcycle 1 is projected onto the shield 21 of the helmet 20 has been exemplified in this embodiment, the present invention is not limited to this. The image which shows the vehicle information related to the motorcycle 1 may be superimposed and displayed on the foreground of the motorcycle 1 via a member that has a function of displaying the image showing the vehicle information such as, for example, an eyeglass (eyewear) type member, a monocle type member, or a sun visor of the motorcycle (vehicle) 1.

Summary of Embodiment

1. The display apparatus according to the above-described embodiment is a display apparatus (30) that provides, to a driver (D) of a vehicle (1), an image showing vehicle information related to the vehicle by superimposing the image on a foreground (FG) of the vehicle, the apparatus comprising:

an obtainment unit (302) configured to obtain information related to a driving state of the driver; and a control unit (304) configured to control a display mode of the image based on the information obtained by the obtainment unit.

According to this embodiment, it is possible to provide the vehicle information related to the vehicle and ensure the field of view of the driver of the vehicle in accordance with the driving state of the driver.

2. The display apparatus (30) according to the above-described embodiment, wherein the information includes information which indicates a load on the driver (D).

According to this embodiment, it is possible to control the display mode of the image which shows the vehicle information related to the vehicle in accordance with the load on the driver.

3. The display apparatus (30) according to the above-described embodiment, wherein in a case in which the load on the driver (D) included in the information obtained by the obtainment unit (302) is larger than a threshold, the control unit (304) erases at least a part of a standard image (IMS) which is to be superimposed and provided on the foreground (FG) of the vehicle (1) when the load on the driver is equal to or smaller than the threshold.

According to this embodiment, it is possible to prioritize (ensure) the field of view of the driver over the vehicle information related to the vehicle in accordance with the load on the driver.

4. The display apparatus (30) according to the above-described embodiment, wherein the larger the load on the driver (D) which is included in the information obtained by the obtainment unit (302) is, the control unit (304) erases at least a part of the standard image (IMS) so as to make a part where the image is superimposed on the foreground (FG) of the vehicle smaller.

According to this embodiment, the field of view of the driver can be prioritized in accordance with the magnitude of the load on the driver.

5. The display apparatus (30) according to the above-described embodiment, wherein the standard image (IMS) includes a plurality of partial images (IM1, IM2, IM3, IM4, and IM5) indicating a plurality of different pieces of vehicle information with different priority degrees from each other, and the control unit (304) starts to sequentially erase the partial image from a partial image which has a low priority degree among the plurality of partial images in accordance with the load on the driver (D) which is included in the information obtained by the obtainment unit (302).

According to this embodiment, even in a case in which the load on the driver is equal to or larger than the threshold, the information related to the safety of the vehicle can be left on the image when the load is not very large.

6. The display apparatus (30) according to the above-described embodiment, wherein the plurality of pieces of vehicle information include, in descending order of the priority degrees, information related to the safety of the vehicle (1), information related to a route of the vehicle, information related to a traveling speed of the vehicle, and information related to a traffic sign at a traveling position of the vehicle.

7. The display apparatus (30) according to the above-described embodiment, wherein in a case in which the load on the driver (D) included in the information obtained by the obtainment unit (302) is larger than a threshold, the control unit (304) decreases the size of an image, which is to be superimposed and provided on the foreground (FG) of the vehicle (1), to be smaller than the size of a standard image (IMS) which is to be superimposed and provided on the foreground of the vehicle when the load on the driver is equal to or smaller than the threshold.

According to this embodiment, the field of view of the driver can be ensured while providing the vehicle information related to the vehicle in accordance with the load on the driver.

8. The display apparatus (30) according to the above-described embodiment, wherein the larger the load of the driver (D) included in the information obtained by the obtainment unit (302) is, the control unit (304) decreases the size of the image which is to be superimposed and provided on the foreground (FG) of the vehicle (1).

According to this embodiment, the field of view of the driver can be prioritized stepwise in accordance with the magnitude of the load on the driver.

9. The display apparatus (30) according to the above-described embodiment, wherein the control unit (304) changes a position of an image which is to be superimposed and provided on the foreground (FG) of the vehicle (1) based on a direction of the load acting on the driver (D) and included in the information obtained by the obtainment unit (302).

According to this embodiment, it is possible to ensure the field of view of the driver in accordance with the direction of the load acting on the driver.

10. The display apparatus (30) according to the above-described embodiment, wherein the control unit (304) determines whether the direction of the load acting on the driver (D) and included in the information obtained by the obtainment unit (302) is rightward or leftward with respect to a direction of the field of view of the driver, changes the position of the image which is to be superimposed and provided on the foreground (FG) of the vehicle (1) leftward when the direction of the load on the driver is rightward, and changes the position of the image which is to be superimposed and provided on the foreground of the vehicle rightward when the direction of the load on the driver is leftward.

According to this embodiment, it is possible to ensure the field of view of the driver with respect to the direction of the load acting on the driver.

11. The display apparatus (30) according to the above-described embodiment, wherein the vehicle (1) includes a straddle type vehicle, and the display apparatus includes a display apparatus which is wearable on the head of the driver (D).

According to this embodiment, the display apparatus can be formed by a head-mounted display.

12. The display apparatus (30) according to the above-described embodiment, wherein the information indicating the load on the driver (D) includes at least one piece of information indicating a traveling speed of the vehicle (1), information indicating the acceleration of the vehicle during traveling, information indicating a bank angle of the vehicle during traveling, information indicating a speed of the head of the driver during traveling, information indicating acceleration of the head of the driver during traveling, information indicating a traveling position of the vehicle, information indicating a handle operation by the driver, and information indicating a brake operation by the driver.

13. The display apparatus (30) according to the above-described embodiment, wherein the information indicating the traveling position of the vehicle (1) includes at least one of information indicating a radius of curvature of a road on which the vehicle is traveling, information indicating that the traveling position of the vehicle is at an intersection, and information indicating that the traveling position of the vehicle is at an area with a high incidence of accidents.

14. The display apparatus (30) according to the above-described embodiment, wherein in a case in which the information indicating the load on the driver (D) includes the information indicating the traveling speed of the vehicle (1), the control unit (304) makes the amount of the vehicle information on an upper part of an image, which is to be superimposed and provided on the foreground of the vehicle, when the traveling speed of the vehicle included in the information obtained by the obtainment unit (302) is higher than a predetermined traveling speed less than the amount of the vehicle information on an upper part of a standard image (IMS), which is to be superimposed and provided on the foreground of the vehicle, when the traveling speed of the vehicle is equal to or less than the predetermined traveling speed.

According to this embodiment, it is possible to ensure the upper part of the field of view of the driver which is generally necessary when the traveling speed of the vehicle is higher than the predetermined traveling speed.

15. The display apparatus (30) according to the above-described embodiment, wherein the obtainment unit (302)

obtains information related to the load on the driver (D) from a detector (16) which is arranged on the vehicle (1) and is configured to detect the load on the driver.

16. The display apparatus (30) according to the above-described embodiment, wherein the obtainment unit (302) includes a detector configured to detect the load on the driver (D).

17. The above-described display control apparatus that controls a display apparatus (30) which provides, to a driver (D) of a vehicle (1), an image showing vehicle information related to the vehicle by superimposing the image on a foreground (FG) of the vehicle, the apparatus comprising:

an obtainment unit (302) configured to obtain information related to a driving state of the driver; and a control unit (304) configured to control a display mode of the image based on the information obtained by the obtainment unit.

According to this embodiment, it is possible to both provide the vehicle information related to the vehicle and ensure the field of view of the driver in accordance with the driving state of the driver.

18. The above-described vehicle (1) comprising:

a display unit (30, 306) configured to provide, to a driver (D) of the vehicle (1), an image showing information related to the vehicle by superimposing the image on a foreground (FG) of the vehicle;

an obtainment unit (302) configured to obtain information related to a driving state of the driver; and a control unit (304) configured to control a display mode of the image based on the information obtained by the obtainment unit.

According to this embodiment, it is possible to both provide the vehicle information related to the vehicle and ensure the field of view of the driver of the vehicle in accordance with the driving state of the driver.

The preferred embodiment of the present invention has been described above. However, the present invention is not limited to this, as a matter of course, and various modifications and changes can be made within the spirit and scope of the present invention. For example, the present invention is not limited to a straddle type vehicle and is applicable to a scooter, a bicycle, a motor trike, or an automobile.

This application claims the benefit of Japanese Patent Application No. 2017-186785, filed Sep. 27, 2017 which is hereby incorporated by reference herein in its entirety.

What is claimed is:

1. A display apparatus that provides, to a driver of a vehicle, an image showing vehicle information related to the vehicle by superimposing the image on a foreground of the vehicle, the apparatus comprising:

an obtainment unit configured to obtain information indicating a load on the driver; and a control unit configured to control a display mode of the image based on the information obtained by the obtainment unit, wherein in a case in which the load on the driver included in the information obtained by the obtainment unit is larger than a threshold, the control unit erases at least a part of a standard image which is to be superimposed and provided on the foreground of the vehicle when the load on the driver is equal to or smaller than the threshold so that a field of view of the driver is ensured, wherein the larger the magnitude of the load on the driver which is included in the information obtained by the obtainment unit is, the control unit erases at least a part of the standard image so as to make a part where the image is superimposed on the foreground of the vehicle smaller, wherein the standard image includes a plurality of partial images indicating a plurality of different pieces of vehicle information with different priority degrees from each other, and the control unit starts to sequentially erase the partial image having a low priority degree among the plurality of partial images in accordance with the load on the driver which is included in the information obtained by the obtainment unit.

2. The apparatus according to claim 1, wherein the plurality of pieces of vehicle information include, in descending order of the priority degrees, information related to the safety of the vehicle, information related to a route of the vehicle, information related to a traveling speed of the vehicle, and information related to a traffic sign at a traveling position of the vehicle.

3. The apparatus according to claim 1, wherein in a case in which the load on the driver included in the information obtained by the obtainment unit is larger than a threshold, the control unit decreases a size of an image, which is to be superimposed and provided on the foreground of the vehicle, to be smaller than the size of the standard image which is to be superimposed and provided on the foreground of the vehicle when the load on the driver is equal to or smaller than the threshold so that the field of view of the driver is ensured.

4. The apparatus according to claim 3, wherein the larger the load of the driver included in the information obtained by the obtainment unit is, the control unit decreases the size of the image which is to be superimposed and provided on the foreground of the vehicle.

5. The apparatus according to claim 1, wherein the control unit changes a position of an image which is to be superimposed and provided on the foreground of the vehicle based on a direction of the load acting on the driver and included in the information obtained by the obtainment unit so that the field of view of the driver is ensured.

6. The apparatus according to claim 5, wherein the control unit determines whether the direction of the load acting on the driver and included in the information obtained by the obtainment unit is rightward or leftward with respect to a direction of the field of view of the driver, changes the position of the image which is to be superimposed and provided on the foreground of the vehicle leftward when the direction of the load on the driver is rightward, and changes the position of the image which is to be superimposed and provided on the foreground of the vehicle rightward when the direction of the load on the driver is leftward.

7. The apparatus according to claim 1, wherein the vehicle includes a straddle type vehicle, and the display apparatus includes a display apparatus which is wearable on the head of the driver.

8. The apparatus according to claim 7, wherein the information indicating the load on the driver includes at least one piece of information indicating a traveling speed of the vehicle, information indicating the acceleration of the vehicle during traveling, information indicating a bank angle of the vehicle during traveling, information indicating a speed of the head of the driver during traveling, information indicating acceleration of the head of the driver during traveling, information indicating a traveling position of the vehicle, information indicating a handle operation by the driver, and information indicating a brake operation by the driver.

9. The apparatus according to claim 8, wherein the information indicating the traveling position of the vehicle includes at least one of information indicating a radius of curvature of a road on which the vehicle is traveling, information indicating that the traveling position of the vehicle is at an intersection, and information indicating that the traveling position of the vehicle is at an area with a high incidence of accidents.

10. The apparatus according to claim 8, wherein in a case in which the information indicating the load on the driver includes the information indicating the traveling speed of the vehicle, the control unit makes the amount of the vehicle information on an upper part of an image, which is to be superimposed and provided on the foreground of the vehicle, when the traveling speed of the vehicle included in the information obtained by the obtainment unit is higher than a predetermined traveling speed less than the amount of the vehicle information on an upper part of a standard image, which is to be superimposed and provided on the foreground of the vehicle, when the traveling speed of the vehicle is equal to or less than the predetermined traveling speed.

11. The apparatus according to claim 1, wherein the obtainment unit obtains information indicating the load on the driver from a detector which is arranged on the vehicle and is configured to detect the load on the driver.

12. The apparatus according to claim 1, wherein the obtainment unit includes a detector configured to detect the load on the driver.

13. A display control apparatus that controls a display apparatus which provides, to a driver of a vehicle, an image showing vehicle information related to the vehicle by superimposing the image on a foreground of the vehicle, the apparatus comprising:

an obtainment unit configured to obtain information indicating a load on the driver; and a control unit configured to control a display mode of the image based on the information obtained by the obtainment unit, wherein in a case in which the load on the driver included in the information obtained by the obtainment unit is larger than a threshold, the control unit erases at least a part of a standard image which is to be superimposed and provided on the foreground of the vehicle when the load on the driver is equal to or smaller than the threshold so that a field of view of the driver is ensured, wherein the larger the magnitude of the load on the driver which is included in the information obtained by the obtainment unit is, the control unit erases at least a part of the standard image so as to make a part where the image is superimposed on the foreground of the vehicle smaller, wherein the standard image includes a plurality of partial images indicating a plurality of different pieces of vehicle information with different priority degrees from each other, and the control unit starts to sequentially erase the partial image having a low priority degree among the plurality of partial images in accordance with the load on the driver which is included in the information obtained by the obtainment unit.

14. A vehicle comprising:

a display unit configured to provide, to a driver of the vehicle, an image showing information related to the vehicle by superimposing the image on a foreground of the vehicle;

an obtainment unit configured to obtain information indicating a load on the driver; and a control unit configured to control a display mode of the image based on the information obtained by the obtainment unit, wherein in a case in which the load on the driver included in the information obtained by the obtainment unit is larger than a threshold, the control unit erases at least a part of a standard image which is to be superimposed and provided on the foreground of the vehicle when the load on the driver is equal to or smaller than the threshold so that a field of view of the driver is ensured, wherein the larger the magnitude of the load on the driver which is included in the information obtained by the obtainment unit is, the control unit erases at least a part of the standard image so as to make a part where the image is superimposed on the foreground of the vehicle smaller, wherein the standard image includes a plurality of partial images indicating a plurality of different pieces of vehicle information with different priority degrees from each other, and the control unit starts to sequentially erase the partial image from a partial image which has a low priority degree among the plurality of partial images in accordance with the load on the driver which is included in the information obtained by the obtainment unit.

* * * * *